United States Patent Office 3,707,527
Patented Dec. 26, 1972

3,707,527
TRIFUNCTIONAL ISOCYANATES PREPARED FROM TRIGLYCIDYL ISOCYANURATE AND DIISOCYANATES
Manfred Budnowski, Dusseldorf-Holthausen, and Edgar Lieske, Dusseldorf, Germany, assignors to Henkel & Cie GmbH, Dusseldorf-Holthausen, Germany
No Drawing. Filed Dec. 16, 1970, Ser. No. 98,866
Claims priority, application Germany, Dec. 20, 1969, P 19 63 899.4
Int. Cl. C08g 22/22, 22/34, 45/00
U.S. Cl. 260—77.5 NC                    10 Claims

ABSTRACT OF THE DISCLOSURE

Trifunctional isocyanates prepared by the reaction of crystalline triglycidyl isocyanurate having an epoxide oxygen content in excess of 14% with 1 mol for each epoxide oxygen in said crystalline triglycidyl isocyanurate, of an organic diisocyanate free of other substituents capable of reacting with epoxide oxygen under anhydrous conditions at a temperature above 100° C. and below the decomposition temperature of the reactants. The invention also relates to the method of preparing the trifunctional isocyanates and the use of the same as hardenable compounds.

THE PRIOR ART

It has long been known to prepare tri- or higher functional isocyanates by the reaction of difunctional isocyanates with alcohols containing 3 or more hydroxyls. The isocyanates thereby obtained may be processed in a known manner with other reactive components to give synthetic resins, lacquers, and the like. It has long been desired, however, to find new trifunctional isocyanates which, when reacted with other compounds containing groups reactive to isocyanates, give synthetic resins or adhesive bonds with an improved heat stability.

OBJECTS OF THE INVENTION

An object of the present invention is the obtaining of trifunctional isocyanates prepared by the reaction of crystalline triglycidyl isocyanurate having an epoxide oxygen content in excess of 14% with 1 mol for each epoxide oxygen in said crystalline triglycidyl isocyanurate, of an organic diisocyanate free of other substituents capable of reacting with epoxide oxygen under anhydrous conditions at a temperature above 100° C. and below the decomposition temperature of the reactants.

Another object of the present invention is the development of a process for the production of trifunctional isocyanates which consists essentially of reacting crystalline triglycidyl isocyanurate having an epoxide oxygen content in excess of 14% with 1 mol for each epoxide group in said crystalline triglycidyl isocyanurate, of an organic diisocyanate free of other substituents capable of reacting with epoxide oxygen, under anhydrous conditions at a temperature above 100° C. and below the decomposition temperature of the reactants.

A further object of the invention is the obtaining of hardenable mixtures of the above trifunctional isocyanates and organic compounds containing several alcoholic hydroxide groups or vicinal epoxide groups.

A yet further object of the invention is the obtaining of hardened resins based on the above trifunctional isocyanates.

These and other objects of the invention will become more apparent as the description thereof proceeds.

DESCRIPTION OF THE INVENTION

The objects of the invention have been achieved by the development of trifunctional isocyanates prepared by the reaction of crystalline triglycidyl isocyanurate having an epoxide oxygen content in excess of 14% with 1 mol for each epoxide oxygen in said crystalline triglycidyl isocyanurate, of an organic diisocyanate free of other substituents capable of reacting with epoxide oxygen under anhydrous conditions at a temperature above 100° C. and below the decomposition temperature of the reactants.

Since crystalline triglycidyl isocyanurate having an epoxide oxygen content in excess of 14% is substantially pure triglycidyl isocyanurate having 3 epoxide oxygen groups per molecule, the same is customarily reacted with the diisocyanates in a mol ratio of 1 to 3. The triglycidyl isocyanurate may be used in the commercial crystallized form, the preparation of which is described, for instance, in U.S. Pat. No. 3,337,509. Appropriately, mixtures of the high and low melting isomeric forms of the triglycidyl isocyanurate are used.

The organic diisocyanates free of other substituents capable of reacting with epoxide groups are well known. Preferably, these compounds have the formula

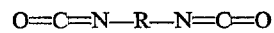

$$O=C=N-R-N=C=O$$

wherein R is a bivalent linkage selected from the group consisting of alkylene having from 4 to 18 carbon atoms, phenylene, naphthylene, diphenylenemethane and diphenylene, and their lower alkylated and lower alkoxylated derivatives as well as methylenecyclohexyl and its lower alkylated derivatives. As diisocyanates, appropriately the commercial types are used. Of interest are, for instance, the isomeric toluylenediisocyanates both in mixtures and in the form of the pure isomers, 4,4'-diphenylmethanediisocyanate, dianisidinediisocyanate, the isomeric naphthylenediisocyanates, 3-isocyanatomethyl-3,5,5-trimethylcyclohexylisocyanate, the so-called isophoronediisocyanate, hexamethylenediisocyanate, decamethylenediisocyanate, and trimethylhexamethylenediisocyanate. Generally, only a definite diisocyanate is utilized in order to obtain defined reaction products. The diisocyanates may, however, also be applied in a mixture, particularly the isomeric toluylenediisocyanates.

The reaction between crystalline triglycidyl isocyanurate and the diisocyanates is carried out with the exclusion of moisture. The reaction temperature is between about 100° C. and below the decomposition temperature of the reactants, preferably approximately between 100° C. and 160° C. Reaction times of about 2 to 20 hours are required. In some cases it may be appropriate to speed up the reaction by the addition of catalysts. For this, small amounts of from 0 to 0.5% by weight of the triglycidyl isocyanurate, of catalysts are utilized, for instance, tertiary amines, quaternary ammonium salts, lithium salts, or cobalt salts.

The trifunctional isocyanates, prepared according to the invention, are distinguished by an extremely low vapor pressure. At room temperature they are pasty or solid. By reaction with polyhydroxyl components or with compounds containing more than one epoxy group in the molecule, synthetic resins may be prepared from them which are distinguished by a good heat form-stability. If adhesive bonding is carried out with the trifunctional isocyanates and epoxy compounds, the hardened bonds have a very good shearing strength also at temperatures up to 200° C.

The trifunctional isocyanates of the invention may be hardened by conventional isocyanate hardening compounds such as organic compounds containing several alcoholic hydroxide groups or vicinal epoxide groups. As organic compounds containing several epoxide groups are those conventional epoxide compounds employed for the production of epoxy resins such as the commercial epoxy resins based on diphenylolpropane and crystalline triglycidyl isocyanurate. As organic compounds containing several alcoholic hydroxide groups are those conventional polyhydroxy compounds employed for the production of urethane resins such as the reaction products of 2 mols of an alkanediol with 1 mol of an alkanedioic acid and the Guerbet condensed fatty alcohols.

The following examples are illustrative of the invention without being deemed limitative in any respect.

Examples

Each time 1 mol equivalent, based on epoxide oxygen content, of triglycidyl isocyanurate (300 gm.) (mixture of the high and low melting form; 15.8% epoxide oxygen content) was reacted with 3 mols of a diisocyanate. The reaction was carried out with agitation at 120° C., with exclusion of moisture.

In the following Table I, the first column gives the example or product number. The amount and kind of the diisocyanate and the reaction time follow. In the last columns the isocyanate content, color and physical form are given.

The trifunctional isocyanates prepared as described above were hardened with either crystallized triglycidyl isocyanurate (15.8% epoxide oxygen content; mixture of the high and low melting form) or with a commercial epoxy resin based on diphenylolpropane (epoxide oxygen content 8.4%), to give synthetic resins. The reaction components were mixed at 120° C. and after gelation hardened for 24 hours at 140° C. and tempered another 24 hours at 200° C.

In the following Table II, in the first column the amount and kind of the epoxy compound (triglycidyl isocyanurate=TGI; commercial epoxy resins, as above=A) are given. In the following column the amount and kind of the triisocyanate are listed. Then, follow the Martens temperature, impact strength and flexural strength of the prepared molded bodies.

TABLE II

| Polyepoxy compound | Isocyanate | Martens temp., °C. | Impact strength kp. cm./cm.² | Fleural. strength kp. cm./cm |
|---|---|---|---|---|
| 100 g. TGI | 272 g. I | 225 | 17 | 1,200 |
| 192 g. A | 272 g. I | 193 | 19 | 1,100 |
| 100 g. TGI | 322 g. II | 228 | 9 | 1,100 |
| 192 g. A | 322 g. II | 174 | 4 | 350 |
| 100 g. TGI | 350 g. III | 248 | 23 | 1,250 |
| 192 g. A | 350 g. III | 177 | 25 | 1,300 |
| 192 g. A | 268 g. IV | 102 | 4 | 850 |
| 100 g. TGI | 310 g. V | 165 | 24 | 1,350 |
| 192 g. A | 310 g. V | 114 | 19 | 1,300 |

Hard aluminum strips of the dimensions 100 x 25 x 1.5 mm. were cemented with mixtures of triglycidyl isocyanurate (TGI) as well as commercial epoxy resins (A) and various triisocyanates, at an overlap of 10 mm. After hardening at 140° C. for 24 hours and tempering at 200° C. for 24 hours the shearing strengths at elevated temperatures were measured.

In the following Table III in the first column the polyepoxy compound utilized is given, and in the following column the isocyanate used. The shearing strengths measured at 100, 150 and 200° C. follow.

TABLE III

| Polyepoxy compound | Isocyanate | Shearing strength at kp./mm. | | |
|---|---|---|---|---|
| | | 100° C. | 150° C. | 200° C. |
| 100 g. TGI | 272 g. I | 1.1–1.2 | 1.1–1.3 | 1.3–1.5 |
| 192 g. A | 272 g. I | 1.3–1.5 | 1.7–1.9 | 1.2–1.7 |
| 100 g. TGI | 322 g. II | 1.0–1.5 | 1.5–1.6 | 1.8–2.0 |
| 192 g. A | 322 g. II | 2.2–2.5 | 1.9–2.2 | 1.0–1.7 |
| 100 g. TGI | 350 g. III | 1.3–1.4 | 1.2–1.4 | 1.3–1.4 |
| 192 g. A | 350 g. III | 1.6–1.9 | 1.2–1.4 | 0.8–1.1 |
| 100 g. TGI | 268 g. IV | 0.8–1.2 | 0.8–0.9 | 0.5–0.8 |
| 100 g. TGI | 310 g. V | 1.8–2.5 | 1.3–1.8 | 0.5–0.9 |

The preceding specific embodiments are illustrative of the practice of the invention. It is to be understood however, that other expedients known to those skilled in the

TABLE I

| Product | Diisocyanate | Time, hours | Isocyanate content, percent | Color |
|---|---|---|---|---|
| I | 522 gm. 2,4-toluylene diisocyanate | 10 | 15.5 | Light yellow brittle. |
| II | 666 gm. isophorone diisocyanate ¹ | 8 | 13.15 | Yellow, brittle. |
| III | 750 gm. diphenylmethane diisocyanate | 13 | 11.84 | Do. |
| IV | 504 gm. hexamethylene diisocyanate ² | 8 | 15.70 | Light yellow pasty. |
| V | 630 gm. trimethylhexamethylene diisocyanate ³ | 11 | 13.75 | Do. |

¹ 0.3 gm. hexadecyltrimethylammonium bromide as catalyst.
² 0.04 gm. Co(II)octoate as catalyst.
³ 0.12 gm. Co(II)octoate as catalyst.

art may be employed without departing from the spirit of the invention or the scope of the appended claims.

We claim:

1. The polyisocyanate product produced by reacting crystalline triglycidyl isocyanurate having and epoxide oxygen content in excess of 14% with 1 mol for each epoxide group in said crystalline triglycidyl isocyanurate of an organic diisocyanate of the formula $$O=C=N-R-N=C=O$$

wherein R is a member selected from the group consisting of (1) alkylene having from 4 to 18 carbon atoms, (2) phenylene, (3) naphthylene, (4) diphenylenemethane, (5) diphenylene, (6) their lower alkylated derivatives, (7) their lower alkoxylated derivatives, (8) methylenecyclohexyl and (9) its lower alkylated derivatives, under anhydrous conditions at a temperature above 100° C. and below the decomposition temperature of the reactants.

2. The product of claim 1 wherein said reacting step is effected at a temperature between 100° C. and 160° C.

3. The product of claim 1 wherein said organic diisocyanate is toluylene diisocyanate.

4. The product of claim 1 wherein said organic diisocyanate is isophorone diisocyanate.

5. The product of claim 1 wherein said organic diisocyanate is diphenylmethane diisocyanate.

6. The product of claim 1 wherein said organic diisocyanate is hexamethylene diisocyanate.

7. The product of claim 1 wherein said organic diisocyanate is trimethylhexamethylene diisocyanate.

8. The product of claim 1 wherein said reacting step is conducted in the presence of from 0 to 0.5% by weight of said crystalline triglycidyl isocyanurate of a catalyst for said reaction selected from the group consisting of tertiary amines, quaternary ammonium halides and cobalt salt of alkanoic acids.

9. The product of claim 8 wherein said catalyst is a cobalt salt of an alkanoic acid.

10. A product of claim 8 wherein said catalyst is a quaternary amminoum halide.

References Cited

UNITED STATES PATENTS 3,505,427    4/1970    Aggias _____ 260—830
3,536,669    10/1970    Kleinschmidt et al. ___ 260—77.5

DONALD E. CZAJA, Primary Examiner

H. S. COCKERAM, Assistant Examiner

U.S. Cl. X.R.

260—47 EN, 47 EP